Feb. 7, 1961 J. T. SALIHI 2,971,062

INBAND SIGNALING SYSTEM

Filed May 20, 1959 3 Sheets-Sheet 1

INVENTOR.
JALAL T. SALIHI

BY Lippincott & Ralls
ATTORNEYS

INVENTOR.
JALAL T. SALIHI

BY
Lippincott & Ralls
ATTORNEYS

Feb. 7, 1961

J. T. SALIHI 2,971,062

INBAND SIGNALING SYSTEM

Filed May 20, 1959

3 Sheets-Sheet 3

INVENTOR.
JALAL T. SALIHI

BY Lippincott & Ralls

ATTORNEYS

United States Patent Office 2,971,062
Patented Feb. 7, 1961

2,971,062

INBAND SIGNALING SYSTEM

Jalal T. Salihi, San Carlos, Calif., assignor to Lenkurt Electric Company, Inc., San Carlos, Calif., a corporation of Delaware Filed May 20, 1959, Ser. No. 814,597

6 Claims. (Cl. 179—84)

This invention relates to voice frequency signaling systems and, more particularly, to inband signaling systems wherein bursts of alternating current of constant frequencies are employed.

The increasing attractiveness of inband signalling in modern telephone systems has been treated adequately in an article by A. Weaver and N. A. Newell which appeared in the Bell System Technical Journal, vol. 33, November 1954, and in the introduction of the copending application Serial No. 808,709, filed April 24, 1959, of Henry G. Kuhn relating to a dual frequency inband signaling system. As pointed out in these two references, inband signaling systems have a number of advantages over direct current signaling systems. Among others, they provide more flexibility, amplification of the signaling voltages is simpler, and the speed of signaling is increased. Most of these advantages are desirable, if not necessary, in modern nation-wide dialing systems. The present invention constitutes an improvement over the systems referred to above in that it relates to an inband signaling system which uses one or more preselected frequency signals as transmission links between transmitting and receiving stations situated anywhere in a voice communication path and between which signaling information must be passed.

Whereas the single frequency system proposed by Weaver and Newell employs so-called "guard action" to protect the receiver against operation by speech signals, the present system employs the shift time delay of saturable cores and auxiliary memory means to effect this function. Not only this, but the present inband signaling system employs a saturable core transmitter to convert the incoming dial pulses or other signal information into switch enabling means for applying signals of preselected frequencies to the voice path. The present invention constitutes an improvement over the Kuhn dual-frequency inband signaling system in that it utilizes the guard action of saturable cores rather than the more conventional guard channels of the Weaver-Newell system. The present system, as compared to existing systems, is more efficient and simpler in construction, maintenance and cost.

Moreover, the present invention constitutes a particular application of the saturable core transmitter or pulse generating circuit, disclosed and claimed broadly in my copending application Serial No. 814,598 filed on an even date herewith, and my selective frequency detecting circuit disclosed and claimed in another one of my copending applications Serial No. 814,526 filed on an even date herewith. Whereas the pulse generation and detector circuits may be employed in a variety of applications, a particular useful combination of these and other components is in the inband signaling system which may be a single or multi-frequency system.

An object of the present invention is to provide an inband signaling system employing one or more frequencies, which is economical to construct, simpler to maintain, and more efficient in operation.

A feature of this invention pertains to an inband signaling system utilizing saturable cores to convert the leading and trailing edges of incoming direct current signaling pulses to control signals and to provide guard action in the receiver circuit thereof.

More particularly, a feature of the invention pertains to an inband signaling system combining a saturable core pulse generating circuit, a source of preselected frequency signals, gating means responsive to the saturable core output to apply the frequency sources to a transmission line, switching means, a tuned circuit responsive to the preselected frequency signals to operate the switching means, a saturable core detecting circuit controlled by the operation of the switching means, and a bistable circuit responsive to the output of the saturable core detector to regenerate the incoming signals and to maintain the core in its instant state of saturation.

Another feature of the invention pertains to an inband signaling system combining saturable core pulse generating means for applying sources of preselected frequencies to voice communication channels, remote frequency detecting means operable to enable an output pulse circuit and saturable core means to delay the operation of the output pulse circuit for a preselected time.

Yet another feature of the invention pertains to the combination of a saturable core transmitter, gating means responsive to the output thereof to apply at least one signal of preselected frequency to a transmission path, amplitude limiter means to control the signals from the transmission path as applied to tuned series resonant circuits, at least one transistor switch operable in response to current flow in the tuned circuit, a saturable core associated with the transistor switch, means to bias the saturable core to a saturated condition of one polarity, means including the transistor switch to cause the saturable core to shift to a saturated condition of the other polarity, and bistable output means responsive to the saturated states of the core to regenerate incoming signal pulses.

Still another feature of the invention pertains to means cooperating with the receiving circuit to disable the voice transmission path during signaling when conductors other than voice transmission ones are used to interconnect the transmitter and receiver circuits.

These and other objects and features will be more fully understood when the following detailed description is read with reference to the drawings in which.

Figure 1:
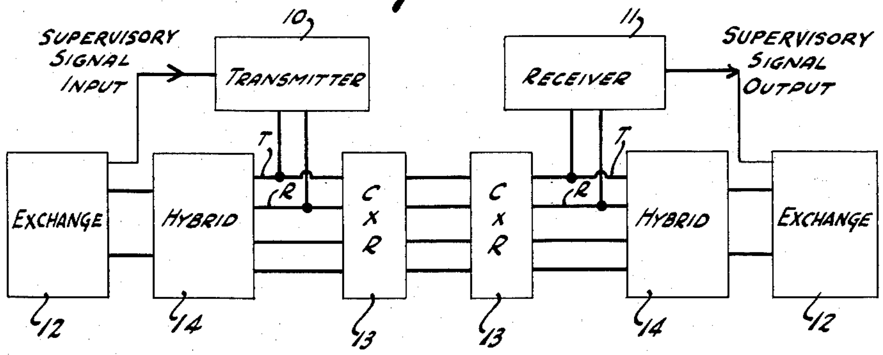
Fig. 1 depicts in block diagram form the transmitter and receiver of the present invention cooperating with a voice transmission system including a carrier terminal.

Looking particularly to Fig. 1, the inband signaling system of the present invention can be seen to include a transmitter 10 and a receiver 11 cooperating with a long distance telephone carrier system communication path between exchanges 12 and 12' at opposite ends of the system. A single voice channel between the two exchanges comprises a two-wire line connecting each of the exchanges 12 and 12' to one of the hybrids 14 and 14' and a four-wire line (two wires for each direction of transmission) connecting the hybrids to the adjacent carrier terminals 13 and 13'. A large number of signals can be transmitted concurrently in different frequency bands between carrier terminals 13 and 13' as is well known, the four-wire connection shown between the carrier terminals being a purely schematic indication that the carrier system acts to transmit signals in both directions between the two four-wire lines leading to the hybrids 14 and 14'. Such connections to a telephone carrier system are well known. In addition, supervisory signals—e.g. dial pulses, on and off-hook signals, etc.—must be transmitted from one exchange to the other. Within the exchange itself, such supervisory signals are carried by additional leads (called at various times the E lead, the M lead, etc.) paralleling the two voice leads (called T and R). Over local lines—e.g. to subscribers' handsets—the supervisory signals are D.-C. impulses carried over the two voice leads, line relays being employed to connect into the supervisory leads at the exchanges. Obviously this will not work through carrier systems, and some other means for transmitting the supervisory signals must be employed. Fig. 1 shows an arrangement for transmitting D.-C. supervisory signals from the exchange 12 on the left to the exchange 12' on the right by converting the D.-C. pulses into A.-C. signals which the carrier system transmits within the voice band. More particularly, the transmitter 10 receives supervisory D.-C. pulse signals from the exchange 12 on the left and supplies A.-C. signals to T and R conductors, which join the carrier terminal 13. The carrier system transmits the A.-C. supervisory signals along with voice signals to a remote carrier terminal 13' where the carrier signals are demodulated and again applied to the T and R conductors. The receiver 11 is connected to the T and R conductors at this remote point, and converts the A.-C. supervisory signals back into D.-C. pulses which are supplied to the exchange 12' on the right.

Figure 2:
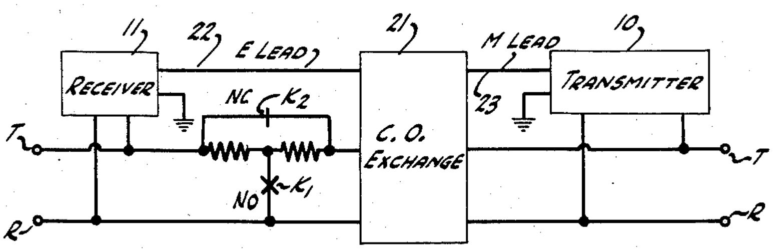
Fig. 2 represents in block diagram form the receiver and transmitter linked through a central office exchange in which the signaling is completed over leads other than those of the voice channel.

Fig. 2 illustrates an arrangement for transmitting the supervisory signals through an intermediate exchange 21 located between the two terminal exchanges. The transmitter 10 and receiver 11 adjacent a central office exchange 21 are connected into the exchange through E-lead 22 and M-lead 23. Because there are two signaling paths available to transmit the supervisory signals through exchange 21, e.g., the voice circuit and the supervisory leads, one of these paths should be broken so that no phasing delays, cross talk or the like will arise. One way in which this may be done, where the E and M leads connect the receiver 11 over lead 22 to the central office exchange 21 and the transmitter 10 thereto over lead 23, is to provide a switching relay K (see Fig. 4) for interrupting the signal path, the contacts of which are indicated in Fig. 2 at K–1 and K–2. The operating path for relay K, the operation of which causes the signal path through T and R to be interrupted, will be explained more particularly in connection with Fig. 4. Suffice it here to say that the interruption must occur whenever dual paths for the transmission of signaling voltages are available.

Figure 3:
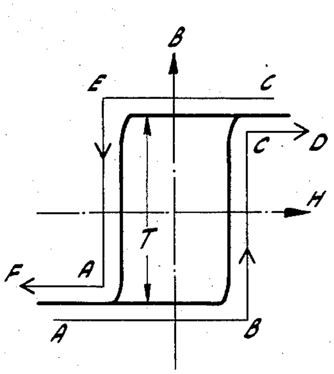
Fig. 3 illustrates the rectangular hysteresis loop of exemplary saturable cores employed in the transmitter and receivers of the present invention.

Fig. 3 schematically represents the square hysteresis loop of saturable cores that are employed in the exemplary embodiments of the present invention. The use of saturable cores having square hysteresis loops is particularly advantageous in that they permit reduction of distortion due to switching two or more oscillators across a common path. The saturable core in moving from its negatively saturated state to the positive one follows the path ABCD. As the core desaturates and saturates to a negative polarity it follows the path CEAF. Thus, it can be seen that the flux buildup follows an essentially square path and that there is a time delay (T), representing the time it takes for the core to desaturate and then resaturate to the opposite polarity, which is equal to the net change in magnetic flux divided by the rate of change.

Figure 4:
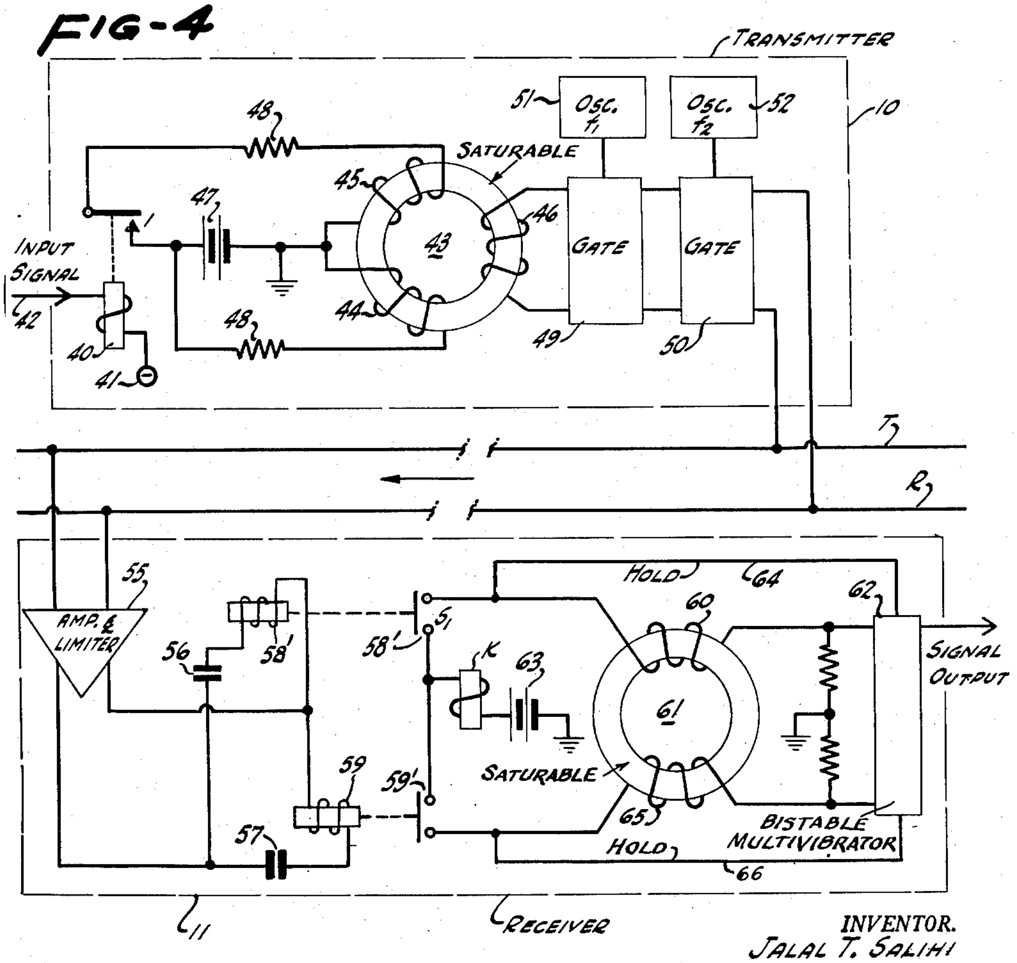
Fig. 4 represents schematically a dual frequency embodiment of the present inband signaling system.

Turning to Fig. 4, the transmitter 10 and receiver 11 depicted in Figs. 1 and 2 may be seen in more detail. Exemplarily, transmitter 10 includes an input signaling relay 40 cooperating with the negative terminal of a source of potential 41 and responsive to input signals on lead 42, which may be one of the supervisory leads of an exchange. Whenever pulses are incoming on lead 42, relay 40 operates. Transmitter 10 also includes a saturable core 43 having input windings 44 and 45 and an output winding 46. A source of D.-C. voltage 47 is provided having its negative terminal connected to ground, and the common point of input windings 44 and 45 of the saturable core 43 is also grounded. The positive terminal of battery 47 is connected to front contact 1 of relay 40 as well as through a dropping resistor 48 to the other terminal of input winding 44. The second terminal of input winding 45 is connected through another dropping resistor 48' to the swinger on relay 40. With this arrangement, source 47 normally biases the saturable core 43 to a negatively saturated magnetic state through the current flowing in winding 44. Due to the opposing polarity of windings 44 and 45, whenever the signaling relay 40 is operated, battery 47 is applied through contact 1 to the other side of input winding 45. This completes a circuit which opposes the magnetizing force resulting from the circuit including winding 44 and, the ampere-turns of winding 45 exceeding the ampere-turns of winding 44 (by choice of winding turns ratio and the relative values of resistors 48 and 48'), acts to reverse the magnetization of the core. After the time delay T, the core 43 shifts to the opposite direction of magnetic saturation, but during the time the core 43 is shifting from a negative to positive saturated state (time T), an output pulse is induced in output winding 46 which controls gates 49 and 50.

Figure 5:
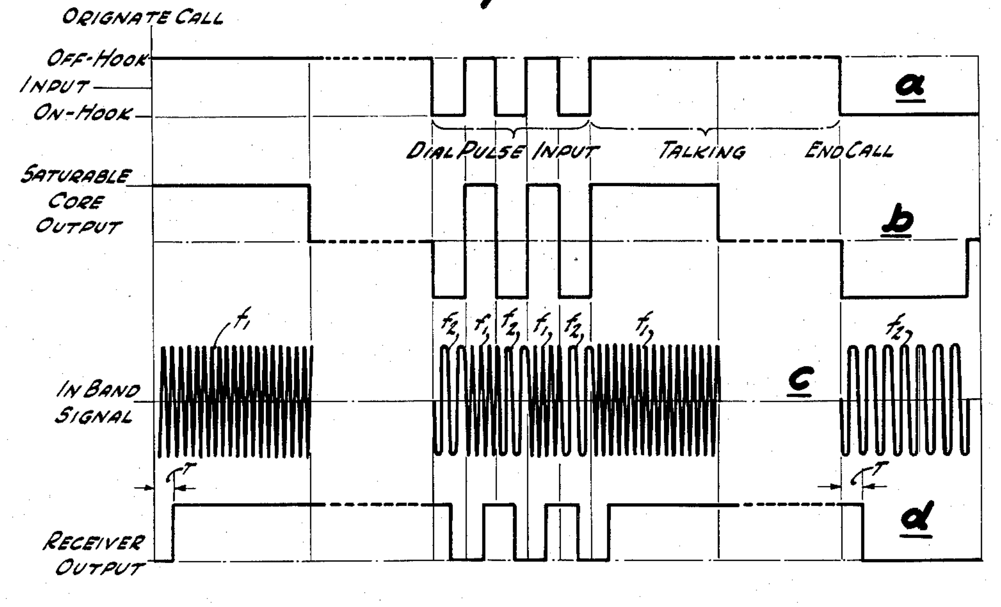
Fig. 5 illustrates signal waveforms, correlated along a time axis, of the exemplary embodiment of Fig. 4.

Gate 49 cooperates with an oscillator 51 which generates a frequency $f_1$, and gate 50 cooperates with an oscillator 52 which generates a different signal frequency $f_2$. With this arrangement, whenever a positive going output pulse appears across the output winding 46, as a result of the saturable core 43 shifting from its negative to positive state, gate 49 places oscillator 51 across the leads T and R to place a burst of frequency $f_1$ on these leads. Whenever a negative pulse appears across output winding 46, as a result of saturable core 43 going from a positive to a negative state, oscillator 52 is placed across the T and R conductors by gate 50 to place a burst of signal of frequency $f_2$ on the conductors. The time coordination of the input pulses to the signaling relay 40 and the outputs across T and R conductors, applied by the gates 49 and 50, can be seen more clearly in Fig. 5. Fig. 5*a* might represent a series of dial pulses placed on the input lead 42 of a dual frequency inband signaling system in accordance with the present invention. Fig. 5*b* illustrates the output of saturable core 43 as a result of the operation of signaling relay 40 in response to the incoming signaling pulses on lead 42. Fig. 5*c* represents the transmitter output or, what is the same thing, the inband signals applied to the T and R conductors, which signals constitute alternating bursts of signals of frequencies $f_1$ and $f_2$. Particularly with respect to Fig. 5*c*, it can be seen that the time delay T of the saturable core 43 is employed to place a burst of $f_1$ signal on the line in the first instance as represented by the on-hook to off-hook condition of Fig. 5*a*. The dial pulses and the inter-digital pauses are too short to utilize the full time delay T of the saturable core 43. Thus, there are alternate short bursts of frequencies $f_1$ and $f_2$ followed by a burst of frequency $f_1$ equal to the full time delay T of the saturable core 43. The latter indicates the time during which a conversation is taking place and is followed by the absence of any signal on the line during the rest of the conversation. At the end of the call, the hook is replaced which causes a burst of frequency $f_2$ signal to be placed on the line, as indicated in Fig. 5*c*. The length of the burst of signal $f_2$ is equal to the full time delay T of the saturable core 43.

Referring back to Fig. 4 then, it will be seen that the output of transmitter 10 is a series of alternate bursts of signal frequencies $f_1$ and $f_2$ which are transmitted over the voice channel (T and R) to the receiver 11. Other modifications of the saturable core generator, as disclosed in my copending application can be used since the one here illustrated is only exemplary.

At the receiver 11, the alternate bursts of $f_1$ and $f_2$, signals are fed through an amplifier-limiter circuit 55 to a pair of series resonant circuits connected in parallel across the output of limiter circuit 55. One of these resonant circuits comprises a capacitor 56 in series with the winding of a relay 58 and resonant to frequency $f_1$. The other comprises a capacitor 57 in series with the winding of a relay 59 and resonant to the frequency $f_2$. When the resonant circuit 56 detects the presence of an $f_1$ signal, relay contact 58' is closed to complete a current path through winding 60 of saturable core 61. After time delay T, during which the changing magnetic flux in the core substantially blocks current flow in the winding, saturable core 61 shifts to its positive saturated state; and thereafter current through winding 60 shifts bistable circuit 62 (e.g., a conventional bistable multivibrator) from one to the other of its two stable states. The current passed through the winding 60 may be traced from a source of D.-C. voltages 63 through the winding of the relay K, contact 58', winding 60 and thence through a dropping resistor to ground. As the bistable circuit 62 operates to its stable state identified with winding 60, it provides a relatively positive voltage to a hold circuit for the winding 60, this hold circuit being the lead 64 connected from an output terminal of the multivibrator to the input side of winding 60, as shown. As a result, the saturable core 61 is maintained in its saturated condition (positive in the example) until the presence of an $f_2$ signal is detected.

As soon as the resonant circuit 57—59 detects the presence of an $f_2$ signal, relay 59 operates to connect positive D.-C. voltage source 63 through the winding 65 of core 61 to ground. This causes the saturable core 61, after a time delay T, to shift to its negative saturated condition; and thereafter current through winding 65 causes the bistable circuit 62 to switch to its other bistable state, which in turn removes the voltage in holding circuit 64 from winding 60 and completes a hold circuit for winding 65 over lead 66. This maintains the saturable core 61 in its negatively saturated state until the presence of an $f_1$ signal is again detected by the resonant circuit 56—58.

The detailed operation of these exemplary transmitter and receiver circuits are explained in more detail in the copending applications referred to above. It is sufficient here to note the broad outline of how the components cooperatively function to provide a versatile inband signaling system.

Figure *5d* illustrates the voltages developed by the exemplary embodiment of Fig. 4. The receiver output is a duplicate of the transmitter input of Fig. *5a*, but displaced along the time axis by the delay T. This constant time delay T, of course, has no effect on the usefulness of the transmitted signaling pulses unless the alternation rate is too rapid or other timing functions are critical.

Figure 6:
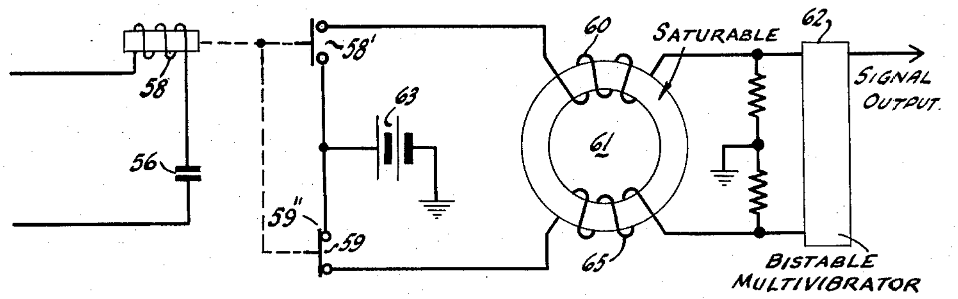
Fig. 6 represents schematically a single inband frequency embodiment of the inband signaling system.
Figure 7:
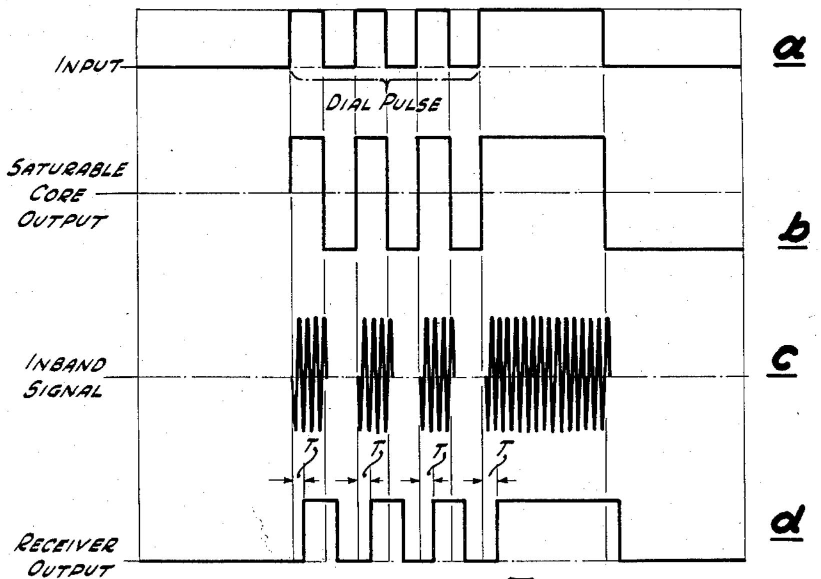
Fig. 7 illustrates signal waveforms, correlated along a time axis, of the exemplary embodiment of Fig. 6.

Turning now to Figs. 6 and 7, which disclose a single frequency embodiment of the present inband signaling system, the transmitter 10 can be identical to the one disclosed in Fig. 4. However, rather than place oscillators of frequencies $f_1$ and $f_2$ on the line alternately, the gating means 49 and 50 will only place bursts of $f_1$ signals on the line, i.e., gate 50 and oscillator 52 may be omitted if desired. The input dial pulses to the transmitter 10 would look, for example, like those depicted in Fig. *7a*, with the saturable core output appearing as in Fig. *7b* and the inband signal on conductors T and R appearing as the portions labeled $f_1$ in Fig. *7c*. Here, as in the case of the output waveform of the exemplary system of Fig. 4, Fig. *7d* illustrates the regenerated input signaling pulses, displaced by constant time delay T of the saturable core 61 of the receiver 11.

The single frequency system just proposed cannot utilize this precise type of transmitter circuit if it is desirable to detect the end of a conversation; that is if the conversation lasts longer than the shift time T of the saturable core transmitter. This occurs because the bursts of $f_1$ signal are only put on the transmission line during the shift time. If the conversation exceeds this time, which it usually will, the replacing of the receiver will not be detected. If it is important to detect the beginning and the end, then a continuous tone can be maintained on the line and a transmitter circuit used to interrupt it. In most subscriber circuits, however, alternate means are available to inform an operator and/or automatic equipment that the receivers have been replaced.

Looking specifically to Fig. 6, receiver circuit 11 includes the amplifier limiter 55 (as shown in Fig. 6) of the previous embodiment as well as the series resonant circuit consisting of capacitor 56 and the winding of relay 58 and tuned to frequency $f_1$. This series resonant circuit again controls the actuation of a relay contact 58' which cooperates with winding 60 of the saturable core 61. One terminal of winding 60 of saturable core 61 is again connected to one input of a bistable circuit 62 and one terminal of the winding 65 is connected to the other input of the bistable current. The saturable core winding 65 is connected through contact 59'' to the positive terminal of battery 63 as before, but with one difference. The contacts 58' and 59'' are a normally open and a normally closed contact of the same relay 58, so that only one of the two contacts 58' and 59'' is closed at one time; thus if the contact 58' is closed as a result of current flowing through the resonant circuit, the contact 59'' is open thereby removing the bias winding 65 from the circuit. The flow of current through winding 60 causes the bistable circuit 62 to assume one of its two stable states, and current flowing in winding 65 causes it to flip to its other stable condition. The two states of the bistable circuit 62 are used to recreate the incoming signaling pulses, as in the previous embodiment.

It will be noted that there are no hold circuits from the bistable circuit 62, since it is necessary not to maintain saturable core 61 in a particular saturated condition. Rather the opening of contact 58' detects the trailing edge of any incoming pulse.

It will be remembered that reference was made to a K relay which is employed in connection with the exemplary system of Fig. 2 to open the voice path whenever the transmitter 10 and receiver 11 were connected through the exchange by the E-lead 22 and the M-lead 23. This K relay may be serially connected between the junction of contacts 58' and 59'' (Fig. 4) and battery 63, so that whenever either contact is closed as a result of detecting a current flowing in its associated series resonant circuit, the relay K operates to close contact K–1 and open its contact K–2 (see Fig. 2). This has a result of disabiling the voice transmission path over conductors T and R, as shown on the Fig. 2 system, during signaling. As soon as the signaling is over, of course, the voice path will be enabled again and the voice signals may be transmitted through the system. It is relatively unimportant what type of technique is employed to switch the voice system out during signaling. It is only necessary that some means be provided for disabling either the E- and M-lead path or the voice transmission path.

While the present invention has been disclosed particularly with respect to single and dual frequency inband signaling systems, it should be obvious that numerous other arrangements may be devised by those skilled in the art, without departing from the scope of the invention.

What is claimed is:

1. An inband signaling system for a voice communication system comprising, in combination, a voice communication channel, a source of D.-C. pulses, a first and a second oscillator for generating a first and a second frequency, gating means, first saturable core means responsive to said series of incoming D.-C. pulses to control said gating means to apply said oscillators alternately to said transmission channel, a pair of resonant circuits tuned to said first and second frequencies respectively, first and second output circuits responsive respectively to current flow in said first and said second resonant circuits, a bistable device controlled by said first and second output circuits to reconstitute said series of incoming D.-C. pulses, second saturable core means associated with said first and second output circuits to block spurious and unsustained signals of said first and second frequencies, and means responsive to said bistable device to maintain said second core means in a saturated state until the other of said two output circuits is energized by current flow in its associated resonant circuit.

2. An inband signaling system for a voice communication system comprising, in combination, a voice transmission path, a source of incoming D.-C. pulses, at least one saturable core having a plurality of windings, means to normally bias said core toward one of its two magnetic saturated states, switching means including one of said windings and responsive to each of said incoming pulses to cause said core to shift from said normal state to the other saturated state thereby to induce a pulse in another one of said windings, a source of at least one preselected frequency, means responsive to said induced pulses to connect said source of preselected frequency to said transmission path, remote amplifier-limiting means associated with said transmission path to equalize the amplitude of the alternating signals connected to said path, at least one circuit tuned to said preselected frequency, a second saturable core having at least one winding and biased to normally maintain a magnetic saturated state of one polarity, second switching means responsive to current flow in said resonant circuit to complete a path through said winding of said core, output means responsive to current flow in said winding circuit after the time delay during which said core shifts from said normally biased state to the other state to reproduce said series of incoming pulses.

3. An inband signaling system for a voice communication channel in accordance with claim 2 and including means associated with said second switching means to block other paths between the source of preselected frequency signals and the remote detector therefor.

4. An inband signaling system for a voice communication system comprising, in combination, a voice communication channel, a source of incoming D.-C. pulses. a saturable core having a plurality of windings, means to normally urge said core towards one of its two magnetic saturated states, means including one of said windings and responsive to said incoming pulses to cause said core to shift from said normal state to the other saturated state thereby to induce a pulse in another one of said windings during the time delay required by said core to shift between said states, a source of first and second preselected frequencies, gating means selectively responsive to the leading and trailing edges of said induced pulses to apply said first and said second preselected frequencies to said voice communication channel, remote amplitude-limiting means associated with said channel to control the relative amplitudes of said preselected frequencies, at least two resonant circuits tuned to said first and second preselected frequencies and connected across the output of said amplitude-limiting means, a second saturable core having a plurality of windings, first switching means responsive to current flow in said first resonant circuit to complete a circuit for one of said plurality of windings of said second core thereby to cause said core to start to shift to one of its two magnetic saturated states, said core upon shifting to one state permitting current to flow in said one winding, second switching means responsive to current flow in said second resonant circuit to complete a circuit for another of said plurality of windings of said second core thereby to cause said core to start to reshift to the other saturated state, said core in reshifting permitting current to flow in said other winding, and a bistable device responsive alternately to current flow in said one and other windings to regenerate said series of incoming D.-C. pulses.

5. An inband signaling system for voice communication system in accordance with claim 4 and including means associated with said first and second switching means for disabling all alternate circuit paths between said source of alternating frequency signals and the detecting circuit therefor.

6. An inband signaling system for a voice communication system comprising, in combination, a source of direct current signal pulses, a first saturable core having first and second input windings and an output winding, means including said first winding to bias said first core to a saturated condition of one polarity, means including said second winding of said first core and responsive to each of said signaling pulses to cause said first core to shift to a saturated condition of the other polarity, said core in shifting inducing a positive pulse in said output winding, oscillator means for generating signals of a first and second frequency, gating means responsive to said positive pulses to apply said first oscillator means to said voice communication system and to the negative pulse induced in said output winding as said core returns to the saturated state of said one polarity to apply said second oscillator means to said voice communication system, and a remote receiver and amplifier-limiting means to control the amplitude of the input signals to said receiver, said receiver including a pair of parallel connected series resonant circuits, each tuned to one of said first and second frequencies, a second saturable core having two windings, first circuit means including one of said windings of said second core responsive to current flow in said first tuned circuit and second circuit means including the other of said windings of said second core responsive to current flow in said second tuned circuit, a bistable circuit, means including said windings of said second core to control said bistable circuit immediately after said core has shifted and means responsive to an electrical position of said bistable circuit to maintain the completed circuit means intack.

References Cited in the file of this patent

UNITED STATES PATENTS 2,299,821 Horton ---------------- Oct. 27, 1942

UNITED STATES PATENT OFFICE
CERTIFICATION OF CORRECTION

Patent No. 2,971,062 February 7, 1961

Jalal T. Salihi

It is hereby certified that error appears in the above numbered patent requiring correction and that the said Letters Patent should read as corrected below.

Column 6, line 31, for "current" read -- circuit --.

Signed and sealed this 25th day of July 1961.

(SEAL)
Attest:

ERNEST W. SWIDER
Attesting Officer

DAVID L. LADD
Commissioner of Patents